United States Patent [19]

Attanasio

[11] 4,087,856
[45] May 2, 1978

[54] LOCATION DEPENDENCE FOR ASSURING THE SECURITY OF SYSTEM-CONTROL OPERATIONS

[75] Inventor: Clement Richard Attanasio, Peekskill, N.Y.

[73] Assignee: International Business Machines Corporation, Armonk, N.Y.

[21] Appl. No.: 701,058

[22] Filed: Jun. 30, 1976

[51] Int. Cl.² ............................................ G06F 13/00
[52] U.S. Cl. .................................................. 364/200
[58] Field of Search .................................... 340/172.5; 364/200 MS File

[56] References Cited

U.S. PATENT DOCUMENTS

| | | | |
|---|---|---|---|
| 3,803,559 | 4/1974 | Bandoo et al. | 340/172.5 |
| 3,827,029 | 7/1974 | Schlotterer et al. | 340/172.5 |
| 3,858,182 | 12/1974 | Delagi et al. | 340/172.5 |
| 3,916,385 | 10/1975 | Parmar et al. | 340/172.5 |
| 3,920,976 | 11/1975 | Christensen et al. | 340/172.5 X |

*Primary Examiner*—Raulfe B. Zache
*Attorney, Agent, or Firm*—Roy R. Schlemmer, Jr.

[57] ABSTRACT

A computer operating system security mechanism employing a non-penetrable hardware means for storing privileged instruction identification data for preventing direct unauthorized access to certain privileged instructions forming a part of the computer operating system; and further including memory address data boundary storage means for each said privileged instruction for preventing indirect access to such privileged instructions in memory by unauthorized branch instructions. The mechanism includes means associated with the computing system instruction register for recognizing privileged instruction and branch instructions. Storage means are included for each privileged instruction it is desired to protect for storing the address of the privileged instruction itself in memory, and both the upper and lower boundary address in memory relating to each such privileged instruction. Whenever a privileged instruction is recognized its address as specified in the running program is compared with the present security mechanism address for said privileged instruction and if there is "no match" a security violation signal and interrupt will be produced. Similarly when any branch instruction is recognized, its address is checked with all privileged instruction boundaries and if found to lie within any stored boundary a security violation and interrupt will similarly be signaled.

10 Claims, 6 Drawing Figures

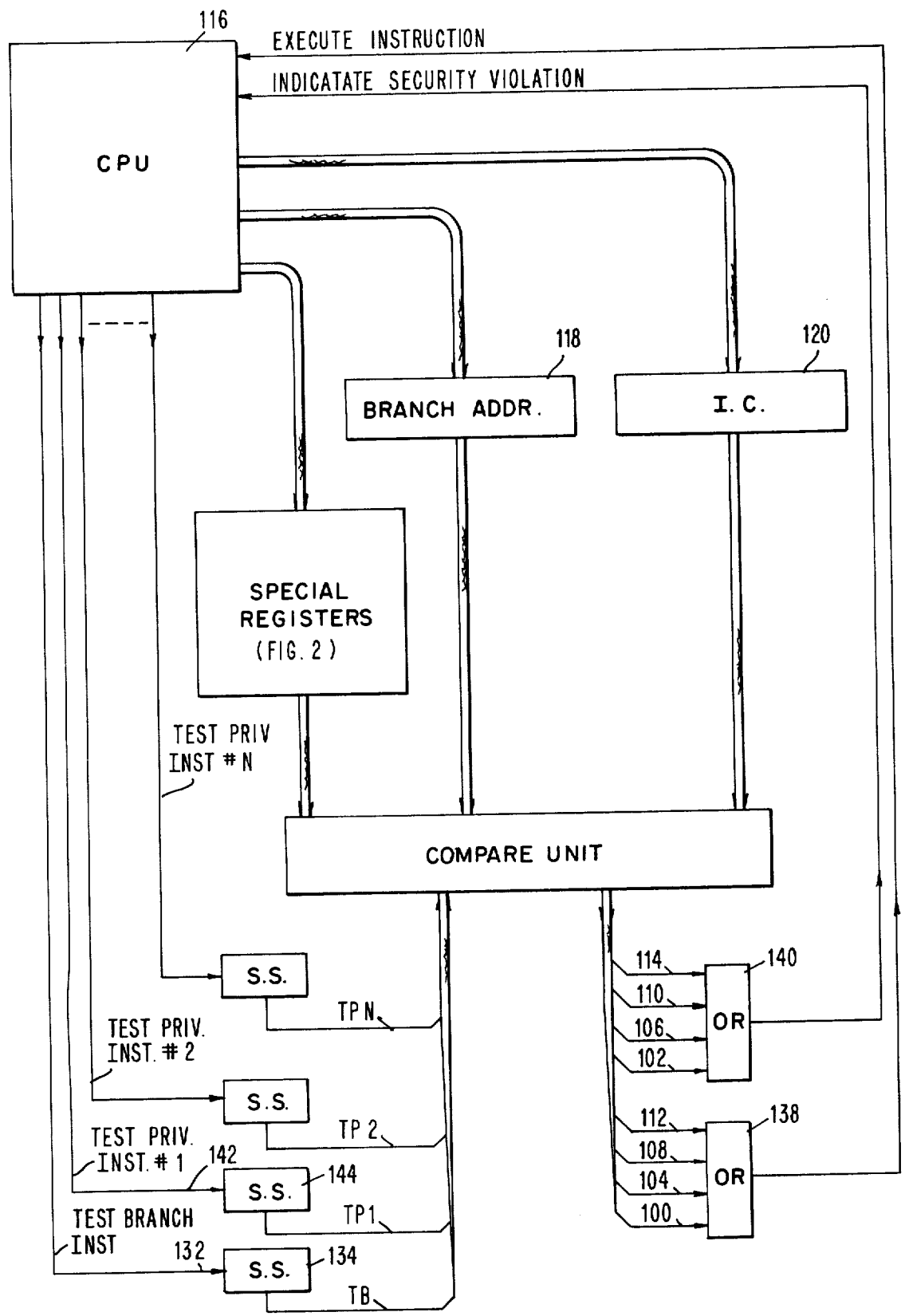

LOCATION DEPENDENCE FOR ASSURING THE SECURITY OF SYSTEM-CONTROL OPERATIONS

BACKGROUND OF THE INVENTION

There is an ever increasing need in industry for data privacy and/or security. In the communications field data being transmitted via radio communication or telephone lines are susceptible of interception and unauthorized user alteration. Various cryptographic systems have been proposed to reduce or eliminate this vulnerability of data to an unauthorized user or penetrator.

In the field of computers the unauthorized access of data may be obtained by accessing various storage devices or intercepting messages being transmitted between terminals or between terminals and the host of a remote access computer network.

Current privacy laws place an increasingly greater burden upon the computer manufacturer and user to guard the privacy of the data of individuals or businesses for unauthorized penetration and use. Such unauthorized access to the computer can have many ramifications too numerous to mention going from the mere access of confidential business or personal data by someone who has no real need to know this information, to the unauthorized access of bank or payroll records which in an exagerated case could cause money to be improperly dispensed, or incorrectly credited to the wrong person's account, resulting in greater potential financial losses.

Many schemes have been proposed in the past for preventing various types of penetration.

For example, in a conventional multi-program, time shared computer system as is commonly in use today, given users are assigned areas of memory to which they are allowed access and they are further given special identifier keys which associate a range of memory addresses accessable to the particular user. In normal operation, if a user attempts to incorrectly access a portion of memory not assigned, the system will cause a security interrupt. However, this latter form of operation assumes that a problem program would be operating in the problem or non-privileged state. When in the supervisory or privileged state the system, in normal usage, would be allowed access to any portion of the computer for any purpose, including modifications of the operating system itself. It is apparent that if an unauthorized user or pentrator is able to subvert the normal security measures and cause the "privileged state" code in the program status word (PSW) of the system to be illegally set to "privileged", with most current systems, such a penetrator would have wide access to many portions of the system.

In the past such situations have occurred through errors in the control program or possibly unusual knowledge and capabilities on the part of a programmer who has been able to devise means of altering the 'state' control bit of the program status word which specifies the state of this system in computers, such as the IBM System 360 and 370 series.

Once the penetrator has gained access to the "privileged" operation set, he is able to interrogate and/or alter the physical control parameters or states of the system which are supposed to be available to and under control of only the system supervisor.

Thus, a basic need in the current CPU architecture is for improved means of assuring operating system security from unauthorized penetrators. Such security should at least be available at any time after the initial program load (IPL) which, of course, assumes the integrity of the programmers and all personnel doing such IPL.

SUMMARY AND OBJECTS OF THE INVENTION

It has now been found that a greatly enhanced operating system security feature may be built into existing CPU architecture schemes which utilizes additional identification parameters for certain classes of privileged instructions, which parameters or identification must be satisfied by a person requesting such privileged operation. It has further been found that by setting up a relatively small number of such special privileged instruction safeguards, operating system integrity or security may be greatly increased. The present invention requires that in order for a privileged instruction to be executed it must not only find the system in the privileged state but also must be satisfactorily positioned when the operation is invoked, which position is stored in a special set of tables which are only setable or alterable at IPL time.

It is accordingly a primary object of the present invention to provide a computing system having a high level of operating system security.

It is a further object of the invention to provide such a system wherein certain privileged instructions must be properly located by special location codes before their execution is permitted.

It is a still further object of the invention to provide such a system wherein the location codes may not be altered by the system and such location may only be entered into the system at IPL time.

It is a further object of the invention to provide means by which indirect branching to privileged instructions is prevented.

It is yet another object of the present invention to provide such a system which will produce a security interrupt signal whenever a user tries to execute a privileged instruction which is not properly located or a branch instruction which falls within certain prohibited ranges of memory addresses or locations.

These and other objects, features and advantages of the present system will be apparent from the following description of the disclosed preferred embodiment of the system.

DESCRIPTION OF THE DRAWINGS

FIG. 1 comprises an overall block diagram of a computing system incorporating the security enhancement of the present invention.

DESCRIPTION OF THE DISCLOSED EMBODIMENT

Figure 2A:
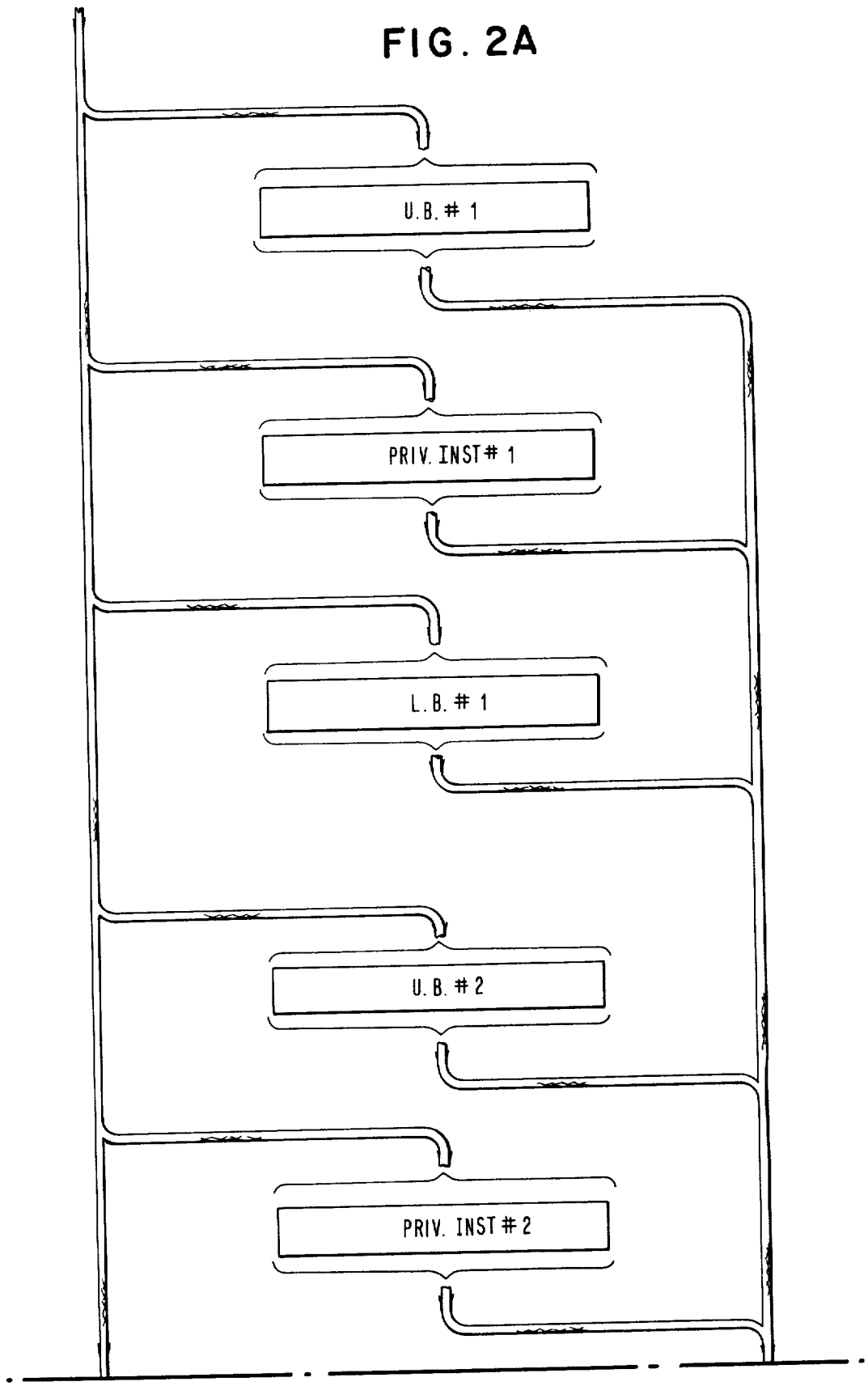
FIGS. 2A and 2B comprise a logical schematic diagram of the "special registers" block shown in FIG. 1.

The objects of the present invention are accomplished in general by a computer operating system security mechanism for use with a central processing unit comprising a memory, an instruction execution unit including a decoder and instruction counter, and a logical processing unit. Said security mechanism includes means for storing the address in said memory of a plurality of privileged instructions, means for storing an upper bound address for each such instruction and means for storing a lower bound address for each such instruction. Said upper and lower bound addresses represent a delineation of the general regions in memory where individual operation included in a privileged instruction set are stored. Said security mechanism includes means associated with said instruction decoder for recognizing whenever a privileged instruction opcode is present in the instruction register or when a branch instruction address is given. Further means are provided to compare the stated address of said privileged instruction detected in the instruction register and for comparing it with the address stored in said security means and means for providing a security violation indication if a "no compare" occurs.

Said security means further include means for comparing any detected branch instruction address detected in said instruction register to determine if it falls within any of the upper bound-lower bound privileged instruction ranges and means operative upon an affirmative determination to produce a security violation indication.

Said system having such a security mechanism would normally also include means for producing "security interrupt" (program interrupt) whenever such a security violation occurs.

In current CPU architectures, such as for example as IBM System 360 and System 370 machines, "privileged" operation is defined as those operations which interrogate or alter physical control parameters or states of the system. Due to the very nature of these operations insofar as the criticality of such control instructions is concerned many attempts are made to limit access to "privileged" instructions, except by programs which are authorized to exercise such basic controls over system operation. In most systems privileged operations may be successfully executed only when a "privilege" indicator in the CPU is set and not otherwise. This indicator is controlled by software executed while the indicator is on and normally consists of a particular bit in the program status word (PSW), which is setable under normally rigorously controlled circumstances.

However, in the past the security of computing systems which contain CPU's, having such a control feature has been penetrated when errors occur in the supervisory software which allows a penetrator's code to execute while the "privilege" indicator is set and thus yields total control capabilities to the penetrator.

Such successful penetration allows the unauthorized person to have access to a wide variety of system facilities which might otherwise not be available, as well as potentially allowing access to data and other information which would not normally be available. In an extreme case this might even be applied to a financial system having cash issuing terminals or some other form of electronic fund transfer system with the result that either money might be directly dispensed to the unauthorized person or some unauthorized person might have credit or other assets, (i.e. stock) credited to his account illegally. The ramifications of this type of system penetration are obvious.

The present operating system security mechanism attacks this problem by placing certain hardware locks upon the operating system which may only be unlocked by following very specific routines and utilizing very specific operating data which theoretically would not be available to a penetrator who had merely obtained access to the system supervisor by means of being able to improperly set the "privileged operation" bit in the PSW. As stated previously, these locks are set, i.e., data loaded into hardware registers at IPL time and once set cannot be altered other than by going through a new IPL routine. It will of course be obvious that any person having access to the system prior to IPL would not be blocked out of the system.

A basic assumption of the present invention is that the supervisory software can be organized in such a way that the total number of actual privileged instructions in the code carrying out critical control functions can be kept to a relatively small number and that each privileged instruction is embedded in a "neighborhood" of code which performs the required validation functions before carrying out the instruction. Typical of the neighborhood code which performs such a validation function would be the following. Before a "LOAD PROGRAM STATUS WORD" instruction is carried out, the supervisor program would insure that the privileged indicator is not on whenever the instruction portion indicates an area of main storage allocated to a non-privileged user's program. Or, before a "START INPUT/OUTPUT" instruction is carried out, the supervisor program verifies that the portion of auxiliary storage being accessed by the operation is licit for the program in main storage receiving or transmitting the data involved.

The present security mechanism thus adds a plurality of hardware registers to the CPU to identify those locations in main storage from which specified privileged operations can be validly executed. For reasons of economy only the subset of privileged operations which are able to adversely affect the security of the system are treated by the security system.

To affect the aforementioned objectives, when the operating system program is prepared, the locations containing the specified privileged operations are kept track of or recorded separately so that they may be loaded into the special set of hardware register provided therefor at initial program load (IPL), which register loading is in effect a hardware operation. Thus, for each privileged operation which it is desired to protect, a register is provided in special hardware which is addressable by the op-code for the instruction and this register contains the location or address in the main system memory where this privileged operation is located. Subsequently, whenever the instruction decoder function of the CPU recognizes one of the specified privileged operations (op-code) the value in the instruction counter is compared against the hardware register containing the address for the specified privileged operation. If there is no successful comparison, the instruction is suppressed and an interrupt taken. The instruction counter is compared with the address in the special register, since this value would normally be loaded into the instruction counter by the program execution mechanism, and if this value were incorrect it would mean that the penetrator was in effect setting up his own privileged instruction for performing an unauthorized operation within the system.

The above description, as will be apparent, is directed to a penetrator's circumventing the existing security provisions of the system and setting up unauthorized privileged instruction sequences and in effect writing one's own set of privileged instructions to accomplish some desired objective. It is thus intent of the present security mechanism, to insure that critical system functions such as the control of I/O subsystems, specification of the virtual-to-rear storage mappings, as well as control of the privileged indicator itself in the PSW, are performed only by the software supervisor code which is resident in a predetermined and specified area and not by the penetrator's code, which has succeeded in gaining control of the system with the aforementioned privileged indicator bit.

In addition to executing a privileged instruction, per se, it is also possible to indirectly perform a particular privileged instruction by avoiding a direct specification of the particular instruction, i.e., privileged, by utilizing a BRANCH or EXECUTE instruction which for example, would allow entry into a particular subset of the privileged operation's code neighborhood while at the same time avoiding some or all of the validation functions for the privileged instruction. Thus, in accordance with the teaching of the present invention, it is desirable to prevent remote execution of certain types of privileged instruction sets by such remote or indirect means. This is readily accomplishable in the present system by adding two additional registers for each privileged instruction which it is desired to protect. These registers comprise an upper bound and a lower bound register and thus define a neighborhood of addresses in the memory which, if otherwise enterable, might allow execution of privileged operations without directly specifying the op-code therefor. In operation, any time that a branch type instruction is encountered, the address of this instruction or location must be checked against all of the specified neighborhoods in the present hardware system to make sure that this branch instruction is not attempting to indirectly enter such a prohibited neighborhood. Thus, in this case, if a match occurs, the system will recognize a security violation and will cause an interrupt to be taken. It will be noted that this is directly opposite to the situation where a specific privileged instruction is specified and its address or instruction counter checked against the specified register in the special hardware of the present system and if a match does occur the instruction will be executed, otherwise a security violation will be noted.

Figures 2, 2B:
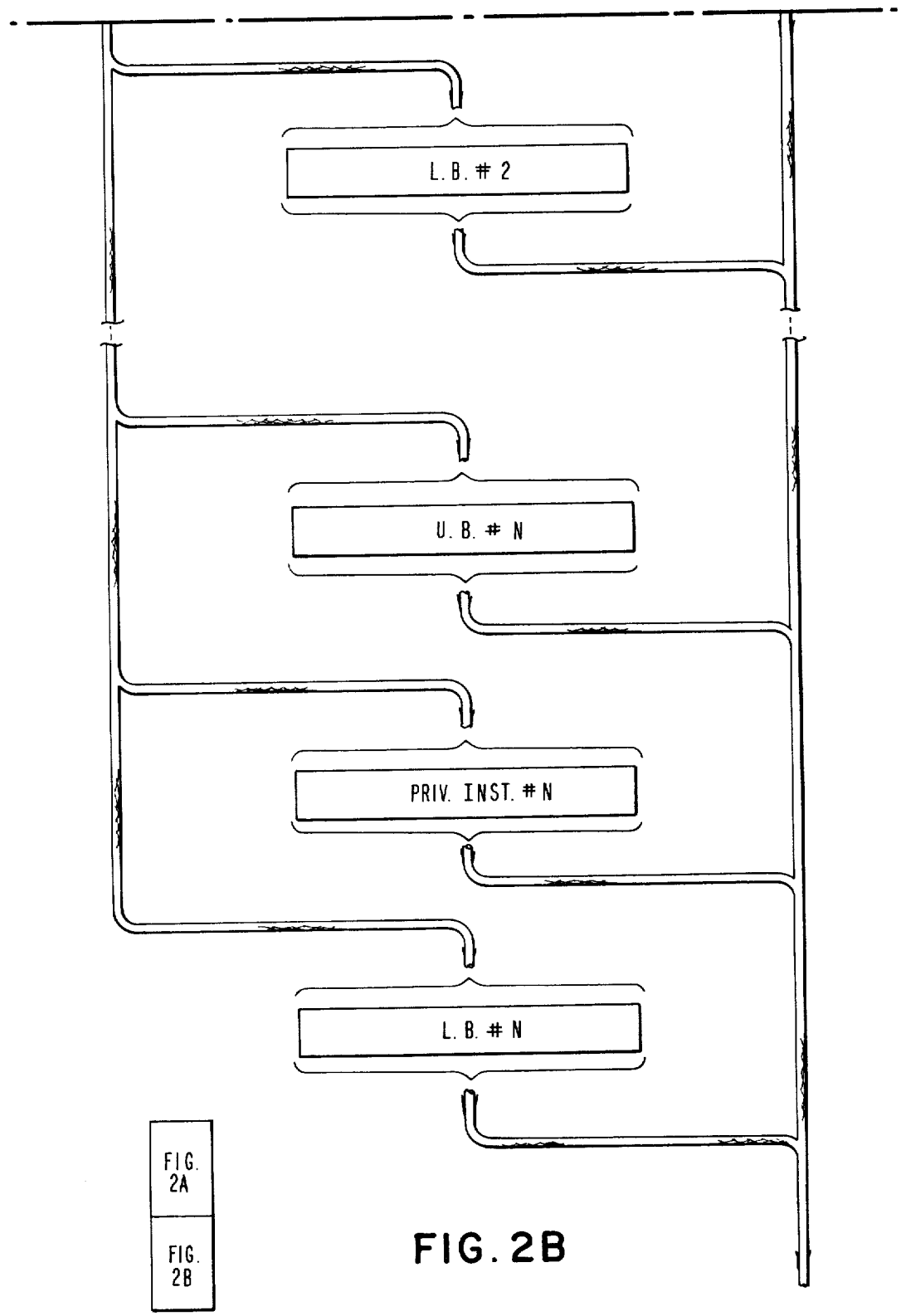
FIG. 2 is an organizational drawing for FIGS. 2A and 2B.

It will thus be apparent that the system of the present invention requires essentially three registers or storage locations for each privileged instruction it is desired to protect. The first register which is directly addressable from the specification of the privileged instruction itself, contains the address in memory, where the specific instruction resides. The other two registers are the previously referenced upper bound and lower bound registers which define the excludable "neighborhood" for the related instruction which must not be entered by indirect or branch instruction means. Such a set of registers is shown in FIG. 2 (2A and 2B) with appropriate busing means for loading and accessing the contents thereof.

Figure 3:
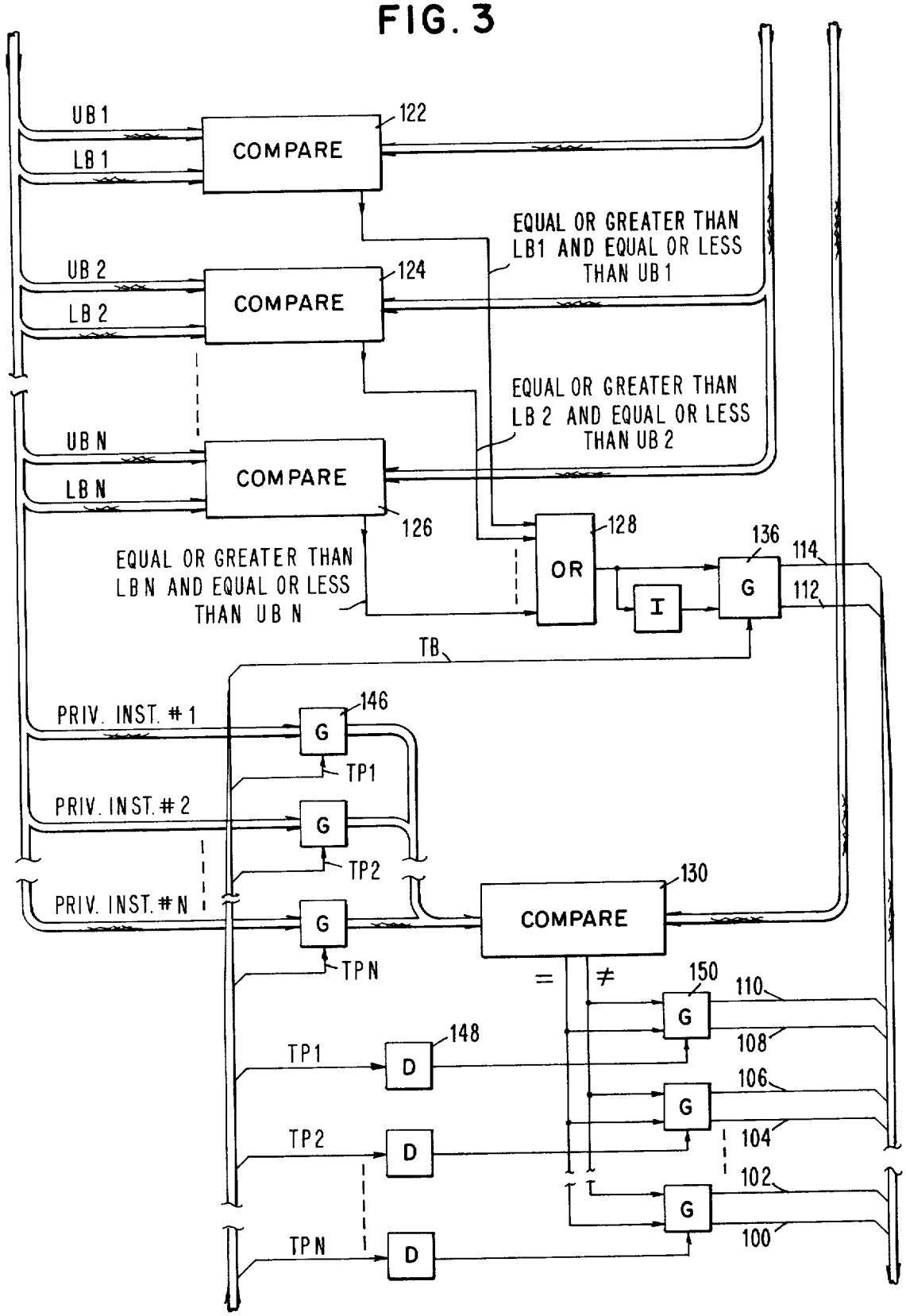
FIG. 3 comprises a logical schematic diagram of the "compare unit" shown in FIG. 1.

The second function required of such a security mechanism is basically an address (range of addresses) comparison function. The hardware for performing this function is shown in FIG. 3 and will be described specifically subsequently. Referring briefly to this figure, the comparison circuit for testing a specific privileged instruction address is the box 130 on FIG. 3, and the compare function for determining whether a particular requested branch instruction falls within any of the prohibited neighborhoods, is performed by the three comparison circuits 122, 124 and 126, also shown on FIG. 3, wherein a successful comparison causes one of the inputs to the OR circuit 128 to be activated. An output from OR 128 will cause a security violation signal to be given and an interrupt to be taken.

The final control function which must be performed by the present hardware is the recognization of either a branch instruction or a privileged instruction in the CPU instruction unit. As stated previously with respect to FIG. 1, such a CPU is designated by the reference number 116, it being noted that this is a completely conventional CPU. The only modification required is some sort of an interlock mechanism attached to the instruction execution unit which will prevent the particular instruction from being executed until approval is obtained from the present security mechanism. Additionally, means must be provided and connected to the decoder for recognizing "branch" instructions and specifically designated "privileged" instructions. These instruction decoder lines are shown emanating from the bottom of CPU 116 shown in FIG. 1. The block entitled, "special registers", comprises the registers shown in FIG. 2 and the cable connection between the special registers and the CPU 116 is for the purpose of initially loading same at IPL time. Branch address and instruction counter registers 118 and 120 may be either those provided in the present security mechanism, as implied by FIG. 1, or may simply be accessible within the CPU. These registers are cabled into the compare unit shown in block form on FIG. 1 and in detail on FIG. 3. Finally the OR circuits 138, and 140 whose outputs feed the "execute" and "security violation" lines into the CPU and are set by the output lines from the compare unit. The subsequent specific description of the operation of the hardware of FIGS. 1 through 3 will clearly set forth the sequences which occur when various types of instructions are encountered in the instruction unit of the CPU.

Figure 4:
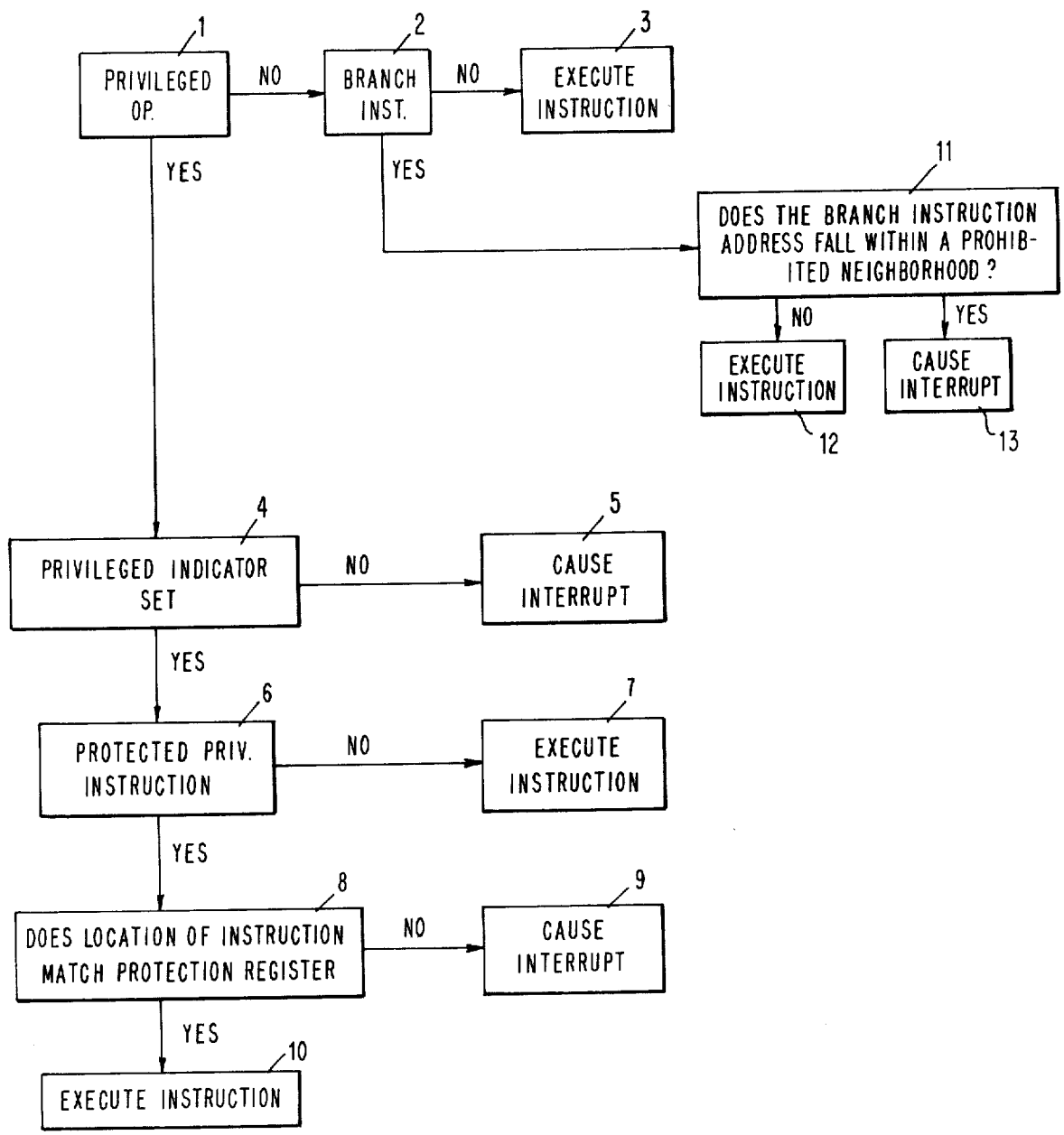
FIG. 4 comprises a flowchart illustrating the instruction execution function of a computer system incorporating the principles of the present invention.

The following brief description of the flowchart of FIG. 4 explains diagrammatically what has been set forth generally before. Block 1 of the FIG. 4 tests the instruction register for a privileged instruction op-code and if it is a PI the next test is to see if it is a branch instruction, if not, it proceedes to block 3, which states that the instruction may be executed directly. If it had been a branch instruction, the system would have proceeded to block 11. Returning to block 1, if a privileged operation had been detected, the system would proceed to block 4, which tests for a conventional privileged indicator in the PSW. If it had not been set, an interrupt would be caused immediately by block 5. If it had been set, the system would proceed to block 6, where a determination is made as to whether or not it is a specifically protected privileged instruction. If the test is no, the system proceeds to block 7 where the instruction is executed. If the answer to the test in block 6 had been yes, the system would proceed to block 8 where a test is made to determine if the specified address of the privileged instruction matches the protection address stored in the security mechanism. If not, the system causes an interrupt in block 9 and if the addresses do match, an "execute instruction" signal is given in block 10.

If on the other hand a branch instruction had been detected, the system would have proceeded to block 11 which interrogates the security mechanism registers to determine whether the specified branch address lies within a prohibited neighborhood of addresses in memory which are specified by the respective sets of upper and lower bound addresses stored in the special registers of the security mechanism. If the answer to this test is no, the system proceeds to block 12 which will cause the branch instruction to be executed. If the answer had been yes, this would have indicated that the branch address was attempting to get into a prohibited instruction set and an interrupt signal would be issued by block 13.

Having thus described the specific sequences of operations of the system with respect to the flowchart of FIG. 4, what will now follow is a detailed desciption of the operation of the hardware. The preceding description of the overall operating theory of the present security mechanism together with the description of the flowcharts has generally indicated the underlying operating principles of the present system as well as clearly explained the specific security violations against which it is desired to provide protection. It should be clearly understood that the initial loading of the special registers of the present invention occur utilizing conventional means at initial program load (IPL) time. It will further be obvious that the system can only provide protection or security after this time and that any penetration of the security data and addresses by persons having access to information at IPL time will obviously bypass the protection afforded by the present system.

During the loading process, the CPU 116, (FIG. 1) loads the special registers (see also FIG. 2 ) with the addresses in memory where each privileged instruction is stored together with an "Upper Bound" address and a "Lower Bound" address for that instruction. As explained previously these bounds define a "neighborhood" for each privileged instruction into which a branch is not allowed to occur. For example, on FIG. 2, the register labeled "U.B. No. 1" contains the upper bound address for priviledged instruction No. 1 and the register labeled "L.B. No. 1"0 contains the lower bound address for privileged instruction No. 1. The address for privileged instruction No. 1 is contained in the register labeled "PRIV. INSTR. No. 1". Thus, for each privileged instruction there is a lower bound address and an upper bound address. A branch instruction is not allowed to branch into an address contained in the range between these two bounds. The foregoing is true for all privileged instructions. In this embodiment, hardware is shown for effecting the principles of the present invention with respect to privileged instruction No. 1, privileged instruction No. 2 and privileged instruction No. N. As many privileged instructions as are necessary can be accommodated by providing enough registers.

On FIG. 1, when the CPU encounters a branch instruction in its instruction register, the branch address is supplied to register 118. The contents of the Instruction Counter are supplied at all times to register 120.

On FIG. 3, the contents of the upper bound register No. 1 and the contents of the lower bound register No. 1 are applied to Compare Unit 122. The contents of the upper bound register No. 2 and the lower bound register No. 2 are applied to compare unit 124 and the contents of the upper bound register No. N and the lower bound register No. N are applied to compare unit 126. The contents of the branch address register 118 are applied to Compare Units 122, 124 and 126. Thus, if the branch address falls within the "neighborhood" of any privileged instruction, OR circuit 128 will have an output.

Also, on FIG. 3, it will be noted that the contents of each privileged instruction register can be gated to the compare unit 130 and compared with the contents of the Instruction Counter 120.

In operation, the CPU (FIG. 1) decodes and executes all instructions in the normal manner except branch instructions and privileged instructions. Branch and privileged instructions must be tested by the circuits of this invention before they can be executed. The way in which this is done is as follows.

When a branch instruction is decoded the CPU provides a pulse on wire 132 (FIG. 1). This turns "on" single shot 134 to cause wire TB to become active. Wire TB extends to FIG. 3 where the pulse on it is applied to Gate 136. If OR circuit 128 has an output, a pulse will appear on wire 114. If OR circuit 128 does not have an output, a pulse will appear on wire 112. These two wires extend to FIG. 1 where a pulse on wire 112 will pass through OR circuit 138 to instruct the CPU to execute the instruction. A pulse on wire 114 will pass through OR circuit 140 to indicate to the CPU that a security violation has taken place.

When privileged instructions No. 1 is decoded, the CPU provides a pulse on wire 142 which turns "on" single shot 144 to provide a pulse on wire TP1. Wire TPI extends to FIG. 3 where the pulse on it is applied to Gate 146 in order to gate the address of privileged instruction No. 1 to the compare unit 130 where it is compared with the contents of the Instruction Counter. The TPI pulse is also applied through Delay Unit 148 to Gate 150 in order to test the output of Compare Unit 130. If the two addresses are equal, a pulse will appear on wire 108 and, if they are unequal, a pulse will appear on wire 110. These wires extend to FIG. 1 where a pulse on wire 108 will extend through OR circuit 138 to cause the CPU to execute the instruction. A pulse on wire 110 will pass through OR circuit 140 to indicate to the CPU that a security violation has occured. The other privileged instructions are tested in the same way.

CONCLUSIONS

It will be apparent to those skilled in the art, that the particular hardware design utilized in the present system for effecting the specified goals could take many forms. It is submitted however, that the basic storage protection registers would of necessity have to be hardwired into the system whether separately located in a black box or included as specific storage locations within the main CPU and it is further necessary that these registers only be loadable at IPL time. The actual specification of addresses which would be loaded into the register would of course have to be done essentially by software means at the time the system program is prepared, and not during the execution of the system program; although the operation of the system itself is hardwired, fixed and thus a portion of the hardware function of the system. The specific details of the timing, the architecture of the comparison function etc. could of course be varied by one skilled in the art without departing from the underlying concepts of the present invention.

While the function of the present system could clearly be emulated or simulated in software it is believed that to do so would in effect compromise the very basis of the present invention and would not normally be an acceptable method for practicing the invention.

I claim:

1. A computer operating system security mechanism including a non-penetrable hardware storage means for storing special privileged instruction identification data for each privileged instruction which it is desired to protect,
   means for loading said special identification data in said storage means and
   said non-penetrable storage means being loadable only during the initial program load time of the system,
   means for recognizing privileged instructions which are presented to the system for execution,
   means for determining if a privileged instruction presented to the system for execution has proper identification data associated therewith, prior to execution of said privileged instruction, said last named means comprising comparison means for accessing said non-penetrable storage means associated with said privileged instruction and the identification data stored therein.

2. A security mechanism as set forth in claim 1, wherein said means for loading data in said non-penetrable storage means includes means for loading the address of said privileged instruction in the operating system portion of the main memory means of said computer and means for utilizing this address as the unique identification data for said privileged instruction.

3. A security mechanism as set forth in claim 1, including further non-penetrable hardware storage means associated with each privileged instruction which it is desired to protect with said security mechanism including
   means for loading the upper bound and lower bound addresses in main memory of the instruction set relating to the execution of the particular privileged instruction in said non-penetrable storage means,
   means for recognizing when a branch instruction is presented to the computer system for execution and
   means for accessing said non-penetrable storage means and determining if said branch instruction lies within any region specified in said security mechanism by said upper and lower bound addresses for any of said privileged instructions, and
   means responsive to an affirmative determination by said last named means to produce a security violation signal for said branch instruction.

4. A computer operating system security mechanism employing a non-penetrable hardware means for storing in a special storage means the addresses of certain privileged instructions in the operating system portion of main memory,
   means for loading said main memory addresses into said special storage means said special storage means being loadable only during initial program loading of the system,
   means for recognizing privileged instructions which are presented to the system for execution,
   means for determining if the address of a privileged instruction presented to the system for execution is the same as the address of said privileged instruction which is contained in said special storage means prior to the execution of said privileged instruction, said last named means comprising comparison means for accessing said special storage means associated with each said privileged instruction,
   further means for storing in said special storage means the upper bound and lower bound addresses in main memory, constituting a region therein, of the instruction set relating to the execution of each particular privileged instruction,
   means for recognizing when a branch instruction is presented to the computer system for execution, and
   means for determining if the target of said branch instruction lies within any region specified by said upper and lower bound addresses stored in said special storage means for any of said privileged instructions, and
   means responsive to an affirmative determination by said determination means to produce a security violation signal for said branch instruction.

5. In an electronic computing system comprising a main memory, an instruction execution unit including a decoder and instruction counter, the improvement which comprises
   a security mechanism for providing operating system security for preventing the unauthorized use of privileged instructions,
   said security mechanism including means for storing the address in said main memory of selected privileged instructions,
   means associated with the instruction decoder for indicating that a specific privileged instruction is present in the instruction unit for execution,
   means for comparing the address of said specified privileged instruction in the instruction unit with the address stored in the storage means of the security mechanism relating to the specified privileged instruction, and
   means responsive to a noncompare of said addresses for producing a security violation indication.

6. A computing system as set forth in claim 5 wherein said security mechanism further includes two additional storage means associated with each privileged instruction for storing an upper bound and lower bound address for each said privileged instruction in said main storage means said addresses constituting a range of instructions relating to a particular associated privileged instruction,
   means associated with said decoder for detecting a branch instruction in said instruction unit, if the target address of said branch instruction in said main storage means lies within the range of addresses of any of said upper and lower bound specified ranges for all privileged instructions and means for producing a security violation indication upon the occurrence of an affirmative test.

7. A method for providing operating system security in a stored program general purpose computer having a special set of privileged instructions to which it is desired to limit access to authorized users, said method comprising examining every instruction presented to said computer's instruction register for execution to determine whether or not it is a privileged instruction, if a privileged instruction is found, checking to determine if the system is legitimately operable in privileged mode and if not causing an interrupt, if the system is in privileged mode determining whether the particular privileged instruction is in a special class of protected instructions, if not executing the instruction and if so, determining if the location of said privileged instruction in memory as specified in said instruction register matches the stated location for said protected privileged instruction stored in a special set of storage devices for each protected privileged instruction and, if the locations do not match, causing a system interrupt and if they do match causing the system to execute the said instruction.

8. A method of providing operating system security as set forth in claim 7, including testing each instruction to determine if it is a branch instruction, accessing the address of said branch instruction and performing an address comparison operation to determine if it lies within a set of address ranges which constitute prohibited areas of the operating system which are not enterable via branch instructions and causing a system interrupt when such an unauthorized branch instruction is encountered.

9. A method for providing operating system security in a stored program general purpose computer having a special set of privileged instructions to which it is desired to limit access to authorized users, said method comprising examining every instruction presented to said system to determine if it is a privileged or a branch instruction, preventing the execution of either until further tests are made, if a privileged instruction is found, determining if the system is legitimately operable in privileged mode and if not causing an interrupt, if the system is in privileged mode determining whether the particular privileged instruction is a special class of protected instructions, if not, executing the instruction and if so, determining if the location of said privileged instruction as specified in said instruction statement matches a specified location for said protected privileged instruction stored in a special set of protection indicators for each protected privileged instruction and if the locations do not match causing a system interrupt and if they do match causing the system to execute the said instruction; if a branch instruction is encountered, accessing the address of said branch instruction and performing an address comparison operation to determine if it lies within a set of address ranges which constitute prohibited areas of the operating system stored in the computer main memory which are not enterable via branch instructions and causing a system interrupt when such an unauthorized branch instruction is encountered and preventing the alteration of the contents of said special protection indicators at any time other than initial program load time and preventing a direct read access to said special protection indicators at any time.

10. A data security mechanism for maintaining operating system security of a host computer when operating in the privileged state, said security system comprising multiple storage means for storing address data for each privileged instruction to which access is to be limited by said security mechanism, said address data including the specific address in the host computer main memory of the specific privileged instruction and the upper bound and lower bound address constituting a region in main memory of all code stored therein relating to each particular privileged instruction, means for detecting the occurrence of a privileged or a branch instruction in the host computer instruction execution unit, means responsive to the detection of a privileged instruction to compare the address of the privileged instruction in the instruction unit with the address stored in said multiple storage means relating to said particular privileged instruction, means for preventing the execution of said privileged instruction if said addresses do not match, means responsive to the occurrence of a branch instruction in the instruction execution unit of the host computer to compare the address of said branch instruction with the ranges of addresses stored in said multiple storage means for all of said special instruction and means for preventing the execution of said branch instruction if said specified address lies within any of said ranges, said multiple storage means including controls whereby said storage means may be loaded with address data relative to said privileged instructions in said main memory only during initial program load time of the host computer.

* * * * *